United States Patent [19]

Herbst

[11] 3,808,953
[45] May 7, 1974

[54] MEANS FOR MOVING THE SCREWS OF INJECTION UNITS IN INJECTION MOLDING MACHINES

[75] Inventor: Richard Herbst, Munich, Germany

[73] Assignee: Krauss-Maffei Aktiengesellschaft, Munich, Germany

[22] Filed: Aug. 9, 1972

[21] Appl. No.: 279,167

[30] Foreign Application Priority Data
Sept. 15, 1971 Germany.......................... 7135155

[52] U.S. Cl. .................................................. 92/2
[51] Int. Cl. ......................................... F01b 21/04
[58] Field of Search.............................. 91/61; 92/2

[56] References Cited
UNITED STATES PATENTS

| | | | |
|---|---|---|---|
| 2,750,816 | 6/1956 | Mott | 91/61 X |
| 2,854,870 | 10/1958 | Chaffee et al. | 91/61 X |
| 2,979,360 | 4/1961 | Nojima | 308/174 X |
| 3,148,145 | 9/1964 | Reed | 308/174 X |
| 3,386,340 | 5/1968 | Engle | 92/2 X |
| 3,510,915 | 5/1970 | Johansson | 92/2 X |

Primary Examiner—Edgar W. Geoghegan
Assistant Examiner—Allen M. Ostrager
Attorney, Agent, or Firm—Michael S. Striker

[57] ABSTRACT

An injection molding machine wherein the plasticizing screw of the injection unit is rotatable and movable axially by a shaft which is rotated by the output element of a rotor. The shaft is movable axially forwardly by a piston which is reciprocable in a hydraulic cylinder. In order to reduce the wear on the piston, the latter is held against rotation and is provided with an enclosure for a set of antifriction bearings which surround the shaft and include an axial bearing located between two radial bearings.

9 Claims, 1 Drawing Figure

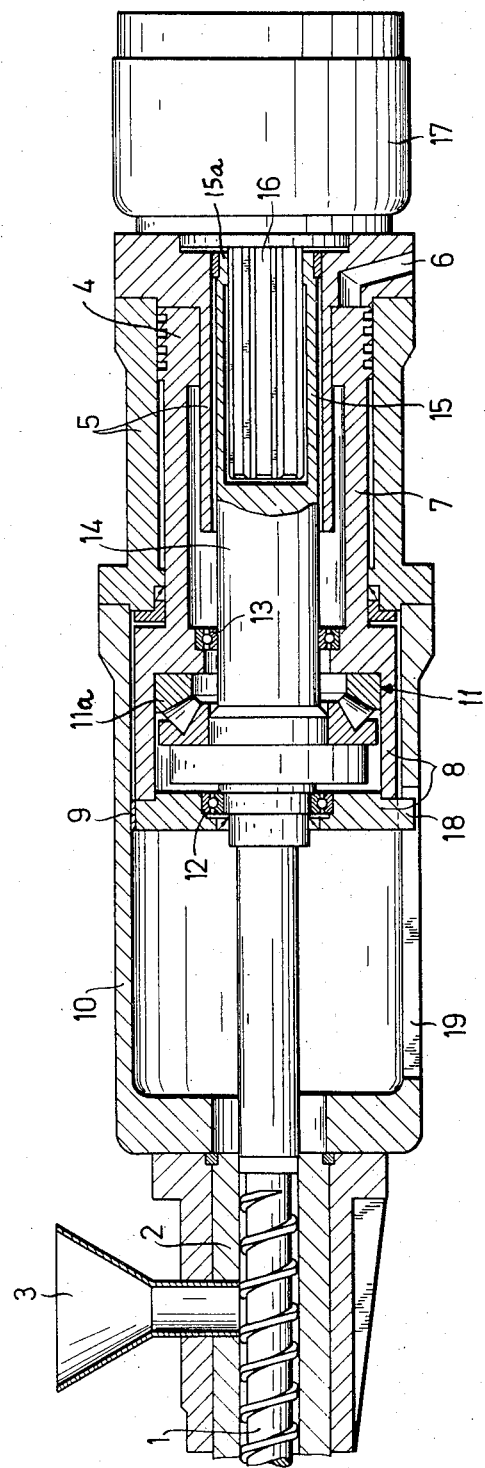

MEANS FOR MOVING THE SCREWS OF INJECTION UNITS IN INJECTION MOLDING MACHINES

BACKGROUND OF THE INVENTION

The present invention relates to injection molding machines in general, and more particularly to improvements in means for imparting axial and angular movements to plasticizing screws in the injection units of injection molding machines.

It is already known to connect the plasticizing screws of the injection unit in an injection molding machine with a rearwardly extending shaft which is movable axially by a hydraulic motor and is rotatable by the output element of a second motor, preferably by way of a set of splines which allow the shaft to move axially while receiving torque from the second motor. The hydraulic motor comprises a piston which is rigid with the shaft for the plasticizing screw so that it must perform axial as well as angular movements. This results in substantial wear upon the sealing elements which are interposed between the piston and the cylinder of the hydraulic motor so that the sealing element must be inspected and replaced at frequent intervals with attendant losses in output.

SUMMARY OF THE INVENTION

An object of the invention is to provide a novel and improved injection molding machine wherein the parts of the motor which effects axial movements of the plasticizing member of the injection unit need not share the angular movements of the plasticizing member with attendant reduction of the wear upon such parts and the sealing elements therefor.

Another object of the invention is to provide simple, rugged and reliable means for imparting angular and axial movements to the plasticizing members of injection units in injecting molding machines.

A further object of the invention is to provide an injection molding machine with novel and improved means which serves to rotate and to move axially the plasticizing screw in the injection cylinder of the machine and comprises a minimal number of rotary parts.

An additional object of the invention is to provide an injection molding machine wherein all parts of the motor which moves the plasticizing screw axially are invariably held against any angular movement with the screw.

The improved injection molding machine comprises an injection unit having a cylinder for reception of granular synthetic thermoplastic material and a plasticizing screw which is rotatable and axially movable in the cylinder to thereby respectively plasticize and expel a batch of synthetic plastic material, a shaft which is connected to or integral with the rear end of the screw and serves to rotate the screw as well as to move the screw axially forwardly toward the outlet of the cylinder, hydraulic motor means which serves to move the screw forwardly and includes a fluid-operated (e.g., single-acting) cylinder member and a piston member reciprocable in the cylinder member and arranged to move the shaft axially forwardly, second motor means which is operable to rotate the shaft in each axial position of the shaft, and antifriction bearing means which is interposed between the piston member and the shaft and is preferably received in an enclosure at the forward end of the piston member. The bearing means comprises an axial bearing which can move the shaft axially in response to a forward movement of the piston member, and at least one radial bearing. It is preferred at this time to employ two radial bearings which are located at the opposite sides of the axial bearing, as considered in the axial direction of the shaft.

The novel features which are considered as characteristic of the invention are set forth in particular in the appended claims. The improved injection molding machine itself, however, both as to its constructions and its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a fragmentary axial sectional view of an injection molding machine which embodies the invention.

DESCRIPTION OF THE PREFERRED EMBODIMENTS

The illustrated injection molding machine comprises an injection unit including a cylinder 2 and a plasticizing screw 1. The screw 1 is rotatble to plasticize the material which is admitted by way of a funnel 3 and the screw is also movable axially forwardly (in a direction to the left, as viewed in the drawing) to expel plasticized material by way of the orifice of the cylinder 2 and into one or more mold cavities, not shown. As the screw 1 rotates, it subjects the introduced material to a progressively increasing plasticizing action and advances the material toward the orifice of the cylinder 2 where the plasticized material accumulates preparatory to injection into the mold. At the same time, the screw 1 moves axially in a direction to the right, as viewed in the drawing, against the opposition of a force which can be furnished by a fluid medium. The screw 1 is moved axially forwardly when the cylinder 2 accumulates a predetermined quantity of plasticized material.

The aforementioned opposing force and the force which is necessary to move the screw 1 axially forwardly is generated by a hydraulic motor including a cylinder member 5 and a piston member having a ring-shaped portion 4 which is reciprocable between the coaxial inner and outer cylindrical walls of the cylinder member 5. The rear chamber of the cylinder member 5 can receive pressurized fluid by way of a port 6 which is connected with a suitable source (e.g., a pump) by a system of valves, not shown. When the screw 1 moves in a direction to the right, as viewed in the drawing, it expels fluid from the rear chamber of the cylinder member 5 by way of the port 6 whereby the fluid offers the necessary resistance to such axial movement of the screw 1. If desired, the cylinder member 5 can be constructed as a double-acting cylinder having a second (front) cylinder chamber which receives a pressurized fluid in order to expel fluid by way of the port 6.

The piston member of the hydraulic motor further comprises a tubular intermediate portion 7 which extends forwardly from the ring-shaped portion 4 and surrounds with clearance the inner cylindrical wall of the cylinder member 5. The front end of the tubular portion 7 is shown as being integral with the cylindrical section of an enclosure 8 which further comprises a disk-shaped section provided with a radially outwardly extending projection or tooth 18.

The rear end of the screw 1 is rigid with a coaxial shaft 14 which extends rearwardly through a central opening of the disk-shaped front section of the enclosure 8 and with clearance into the inner cylindrical wall of the cylinder member 5. The rear end portion 15 of the shaft 14 is hollow and has an annulus of internal teeth 15a mating with the elongated axially parallel external teeth or splines on the output shaft 16 of a second motor 17 which is operable to rotate the screw 1 by way of the shaft 14 in each axial position of the shaft 14.

The means for holding the piston member 4, 7, 8 against rotation with the shaft 14 comprises a housing 10 which is rigid with the rear end portion of the cylinder 2 and has an elongated slot 19 which is parallel with the axis of the shaft 14 and reciprocably receives the projection 18 of the enclosure 8. A sleeve bearing 9 is interposed between the disk-shaped front section of the enclosure 8 and the internal surface of the housing 10.

In accordance with a feature of the invention, the enclosure 8 of the piston member in the cylinder member 5 surrounds a set of three antifriction bearings including a centrally located axial bearing 11, a front radial bearing 12 and a rear radial bearing 13. The axial bearing 11 is a roller thrust bearing having an annular of frustoconical rolling elements 11a whose axes make an acute angle with the axis of the shaft 14. The outer race of the front radial bearing 12 (e.g., a single-row ball bearing) is mounted in the disk-shaped front section of the enclosure 8, and the outer race of the rear radial bearing 13 (which is shown as being similar to the bearing 12) is received in the rear end of the rear section of the enclosure 8. The inner races of the bearings 11, 12, 13 surround the adjacent portions of the shaft 14 so that the latter is centered in the enclosure 8.

If desired, the end portion 15 of the shaft 14 can be provided with external teeth and the output shaft 16 of the motor 17 is then provided with internal teeth which mate with and allow axial movements of external teeth on the shaft 14.

An important advantage of the improved injection molding machine is that the piston 4, 7, 8 of the motor which moves the plasticizing screw 1 axially need not share (and actually cannot share) the angular movements of the shaft 14 which rotates the screw 1. Thus, the motor 17 rotates a minimal number of parts (only the shaft 14) which are absolutely necessary to transmit torque to the screw 1. This results in a considerable reduction of wear and renders it possible to move the screw by a compact, single and rugged mechanism which is capable of long-lasting use to thus reduce the total period of idleness of the machine. The absence or reduction of wear is particularly important in connection with the sealing elements which are interposed between the piston member 4, 7, 8 and the cylinder member 5. Such sealing elements are shown but not identified in the drawing.

The provision of the enclosure 8 at the front end of the tubular piston portion 7 contributes to a further simplification of the machine. Thus, the two sections of the enclosure 8 can receive and locate the outer races of all three antifriction bearings. The housing 10 contributes to stability of the means for moving the screw 1 relative to the cylinder 2 and further insures that the piston of the hydraulic motor cannot rotate with the shaft 14.

Without further analysis, the foregoing will so fully reveal the gist of the present invention that others can, by applying current knowledge, readily, adapt it for various applications without omitting features which fairly constitute essential characteristics of the generic and specific aspects of any contribution to the art and, therefore, such adaptations should and are intended to be comprehended within the meaning and range of equivalence of the claims.

What is claimed and desired to be protected by letters patent is set forth in the appended:

1. In an injection molding machine, a combination comprising an injection unit having a cylinder and a plasticizing member rotatably and axially movably installed in said cylinder; a shaft connected with and arranged to transmit angular and axial movements to said plasticizing member; hydraulic motor means for moving said plasticizing member axially, including a cylinder member and a fluid operated piston member reciprocable in said cylinder member and arranged to move said shaft axially; anti-friction bearing means interposed between said piston member and said shaft so that the latter is free to rotate relative to said piston member, said bearing means including a radial and an axial anti-friction bearing; second motor means axially displaced from said piston member and operable to rotate said shaft in each axial position of the latter; and means for holding said piston member against rotation with said shaft.

2. A combination as defined in claim 1, wherein said means for holding comprises a housing rigid with said cylinder of said injection unit and having an elongated slot parallel to the axis of said shaft, said piston member having a projection extending into and being movable lengthwise of said slot.

3. A combination as defined in claim 2, further comprising additional bearing means interposed between said housing and said piston member.

4. A combination as defined in claim 3, wherein said piston member further comprises an enclosure for said antifriction bearing means, said additional bearing means comprising a sleeve bearing located between said enclosure and said housing and said projection being provided on said enclosure.

5. A combination as defined in claim 1, wherein said second motor means comprises a second shaft coaxial with said first mentioned shaft, one of said shafts having internal teeth and the other of said shafts having external teeth with said internal teeth and permitting axial movements of said first mentioned shaft relative to said second shaft.

6. A combination as defined in claim 1, wherein said piston member is arranged to move said shaft in a predetermined direction so as to effect the expulsion of plasticized material from the cylinder of said injection unit by way of said plasticizing member, said axial bearing being installed between said piston member and said shaft to move the latter axially in response to movement of said piston member in said predetermined direction.

7. A combination as defined in claim 6, wherein said axial bearing comprises an annulus of conical rolling elements having axes inclined with reference to the axis of said shaft.

8. A combination as defined in claim 1, wherein said piston member comrpses a ring-shaped portion slidable in said cylinder member, a tubular portion provided at one axial end of said ring-shaped portion, and an enclosure secured to said tubular portion, said antifriction bearing means being mounted in said enclosure.

9. A combination as defined in claim 1, wherein said antifriction bearing means further comprises a second radial bearing, said axial bearing being located between said radial bearings as considered in the axial direction of said shaft.

* * * * *